United States Patent
Hayashida et al.

(10) Patent No.: US 9,777,157 B2
(45) Date of Patent: Oct. 3, 2017

(54) FLUOROSILICONE RUBBER COMPOSITION

(71) Applicant: Shin-Etsu Chemical Co., Ltd., Tokyo (JP)

(72) Inventors: Osamu Hayashida, Annaka (JP); Takao Uno, Annaka (JP); Kazuhiro Oishi, Annaka (JP); Atsuhito Kashima, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 258 days.

(21) Appl. No.: 14/645,829

(22) Filed: Mar. 12, 2015

(65) Prior Publication Data

US 2015/0259532 A1 Sep. 17, 2015

(30) Foreign Application Priority Data

Mar. 12, 2014 (JP) .................................. 2014-048767

(51) Int. Cl.
*C08L 83/08* (2006.01)
*C08G 77/20* (2006.01)
*C08G 77/24* (2006.01)

(52) U.S. Cl.
CPC .............. *C08L 83/08* (2013.01); *C08G 77/20* (2013.01); *C08G 77/24* (2013.01)

(58) Field of Classification Search
CPC combination set(s) only.
See application file for complete search history.

(56) References Cited

U.S. PATENT DOCUMENTS

| | | | |
|---|---|---|---|
| 4,988,758 A | 1/1991 | Fukuda et al. | |
| 5,342,879 A | 8/1994 | Takahashi et al. | |
| 5,824,736 A | 10/1998 | Kobayashi et al. | |
| 5,916,937 A * | 6/1999 | Evans | C08K 5/3415 524/105 |
| 6,369,155 B1 * | 4/2002 | Takita | C08L 83/08 277/910 |

FOREIGN PATENT DOCUMENTS

| | | | | |
|---|---|---|---|---|
| CN | 104231638 A | * | 12/2014 | |
| EP | 0 551 211 A1 | | 7/1993 | |
| EP | 0667373 A2 | * | 8/1995 | ............... C08K 3/22 |
| EP | 1728830 A2 | * | 12/2006 | ............... C08L 83/08 |
| EP | 2228408 A1 | * | 9/2010 | ......... B01D 19/0409 |
| JP | 5-8947 | | 2/1993 | |
| JP | 2729871 | | 3/1998 | |
| JP | 3497381 | | 2/2004 | |
| JP | 5338380 | | 11/2013 | |

OTHER PUBLICATIONS

Extended European Search Report issued Aug. 3, 2015 in European Patent Application No. 15157981.0.

\* cited by examiner

*Primary Examiner* — Nicole M Buie-Hatcher

(74) *Attorney, Agent, or Firm* — Oblon, McClelland, Maier & Neustadt, L.L.P.

(57) ABSTRACT

A fluorosilicone rubber composition comprising (A) an alkenyl-rich fluorosilicone gum, (B) an alkenyl-poor fluorosilicone gum, (C) reinforcing silica, and (D) a curing catalyst cures into a product which experiences little change of physical strength even after immersion in alcohol-containing fuel oil.

20 Claims, No Drawings

FLUOROSILICONE RUBBER COMPOSITION

CROSS-REFERENCE TO RELATED APPLICATION

This non-provisional application claims priority under 35 U.S.C. §119(a) on Patent Application No. 2014-048767 filed in Japan on Mar. 12, 2014, the entire contents of which are hereby incorporated by reference.

TECHNICAL FIELD

This invention relates to a fluorosilicone rubber composition which cures into a product that experiences little loss of strength even after immersion in alcohol-containing fuel oil.

BACKGROUND ART

Silicone rubber compositions are used in a wide variety of fields by virtue of their advantages including ease of working, ease of molding, and excellent molded properties such as heat resistance, freeze resistance, weather resistance and electrical insulation. In particular, compositions based on fluorosilicone rubber having 3,3,3-trifluoropropyl groups as side chain have solvent resistance as well and find use as diaphragms, O-rings, oil seals and other parts in transportation equipment and petroleum-related equipment.

However, it is known that fluorosilicone rubber substantially swells and loses its physical strength in alcohol-mixed fuels which are increasingly used in modern vehicles or the like. For example, the rubber is found to experience a substantial loss of strength when immersed in FAM B (test fuel oil consisting of toluene, isooctane, diisobutylene, methanol, ethanol and water) employed in Europe. Efforts to develop fluorosilicones having enhanced durability to alcohol fuel were made in the past as described in Patent Documents 1 to 3. These methods, however, fail to improve the tensile strength of fluorosilicone after immersion in alcohol-containing fuel oil.

In Patent Document 4, the applicant proposed an organopolysiloxane as an effective structural material for use at the site where heat resistance and oil resistance are required. This organopolysiloxane alone is still insufficient as a structural material durable to alcohol-containing fuel oil.

CITATION LIST

Patent Document 1: JP-B H5-8947 (U.S. Pat. No. 4,988,758)
Patent Document 2: JP 2729871 (U.S. Pat. No. 5,342,879, EP 0551211)
Patent Document 3: JP 3497381
Patent Document 4: JP 5338380

DISCLOSURE OF INVENTION

An object of the invention is to provide a fluorosilicone rubber composition which cures into a product that experiences little loss of strength even after immersion in alcohol-containing fuel oil.

The inventors have found that a combination of two types of fluorosilicone gums with a reinforcing filler is effective for suppressing the degradation of physical strength of its cured product after immersion in alcohol-containing fuel oil.

In one aspect, the invention provides a fluorosilicone rubber composition comprising:

(A) 10 to 90 parts by weight of a fluorosilicone gum of the general formula (1), (B) 90 to 10 parts by weight of a fluorosilicone gum of the general formula (4), the sum of components (A) and (B) being 100 parts by weight, (C) 2 to 100 parts by weight per 100 parts by weight of the sum of components (A) and (B) of reinforcing silica having a specific surface area of at least 130 m²/g, and (D) a catalytic amount of a curing catalyst.

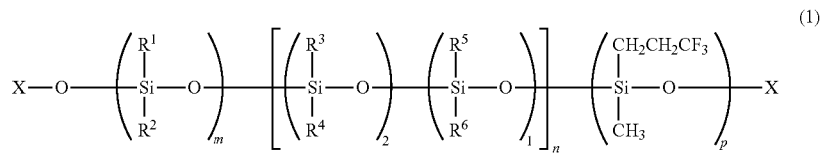

Herein $R^1$ to $R^5$ are independently a substituted or unsubstituted, monovalent hydrocarbon group of 1 to 8 carbon atoms, $R^6$ is a substituted or unsubstituted, aliphatic unsaturated, monovalent hydrocarbon group of 2 to 10 carbon atoms, and X is a hydrogen atom or a silyl group of the general formula (2) or (3):

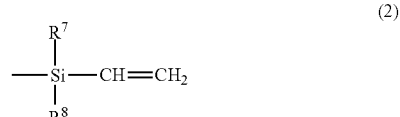

wherein $R^7$ to $R^{11}$ are independently a monovalent hydrocarbon group of 1 to 8 carbon atoms free of aliphatic unsaturation, m is an integer of 0 to 30, n is an integer of 1 to 100, p is an integer of at least 500, unit (B) of the formula:

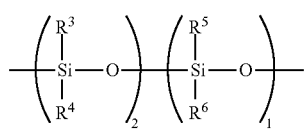

and unit (C) of the formula:

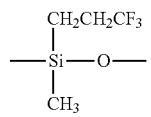

are randomly arranged, and —SiR$^3$R$^4$O— and —SiR$^5$R$^6$O— units in unit (B) are randomly arranged.

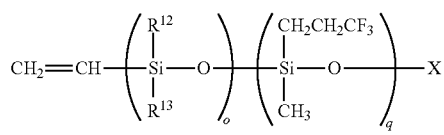

Herein R$^{12}$ and R$^{13}$ are independently a substituted or unsubstituted, monovalent hydrocarbon group of 1 to 8 carbon atoms free of aliphatic unsaturation, X is as defined above, o is an integer of 0 to 30, and q is an integer of at least 500.

In a preferred embodiment, the fluorosilicone gum (A) contains 0.05 to 0.5 mol % of aliphatic unsaturated, monovalent hydrocarbon groups based on the total of silicon-bonded, substituted or unsubstituted, monovalent hydrocarbon groups.

In another aspect, the invention provides a silicone rubber part which is formed by curing the fluorosilicone rubber composition defined above, the part being used as a structural member in contact with alcohol-containing fuel oil.

In the present invention, the fluorosilicone rubber composition means that in the base polymer, almost all (usually at least 90 mol %, especially at least 95 mol %) diorganosiloxane units constituting the main chain of a linear diorganopolysiloxane as the base polymer are composed of 3,3,3-trifluoropropylmethylsiloxane units, i.e., about 50 mol % of substituted or unsubstituted monovalent hydrocarbon groups bonded to silicon atoms are 3,3,3-trifluoropropyl group and thus the number of 3,3,3-trifluoropropyl group is substantially the same number of silicon atom in a molecule. Therefore, the fluorosilicone rubber composition comprises the fluorosilicone gum having the above-described specific molecular structure as a base polymer or the main component and is substantially different from the ordinary silicone rubber composition comprising a dimethylpolysiloxane or the like as a base polymer from the viewpoint of chemical and physical properties.

ADVANTAGEOUS EFFECTS OF INVENTION

The fluorosilicone rubber composition of the invention forms a silicone rubber molded part which experiences little loss of strength even when it is swollen in alcohol-containing fuel oil.

DESCRIPTION OF EMBODIMENTS

Component (A) is a fluorosilicone gum represented by the average compositional formula (1).

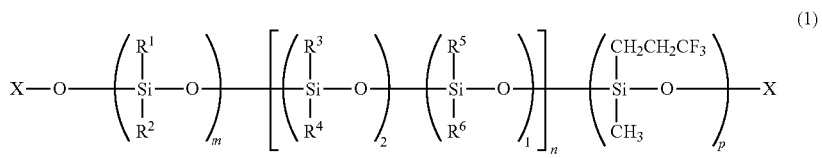

Herein R$^1$ to R$^5$ are each independently a substituted or unsubstituted, monovalent hydrocarbon group of 1 to 8 carbon atoms. R$^6$ is a substituted or unsubstituted, aliphatic unsaturated, monovalent hydrocarbon group of 2 to 10 carbon atoms. X is a hydrogen atom or a silyl group of the general formula (2) or (3):

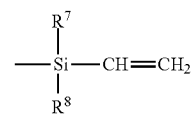

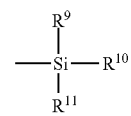

wherein R$^7$ to R$^{11}$ are each independently a monovalent hydrocarbon group of 1 to 8 carbon atoms free of aliphatic unsaturation, m is an integer of 0 to 30, n is an integer of 1 to 100, and p is an integer of at least 500. In formula (1), unit (B) of the formula:

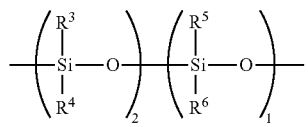

and unit (C) of the formula:

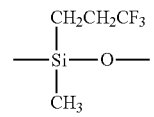

are randomly arranged. In unit (B), —SiR³R⁴O— and —SiR⁵R⁶O— units are randomly arranged.

In formula (1), $R^1$ to $R^5$ are selected from substituted or unsubstituted, monovalent hydrocarbon groups of 1 to 8 carbon atoms, preferably substituted or unsubstituted, aliphatic unsaturation-free, monovalent hydrocarbon groups of 1 to 6 carbon atoms, examples of which include alkyl groups such as methyl, ethyl, propyl, isopropyl, butyl, isobutyl, tert-butyl, pentyl, hexyl, cyclohexyl, heptyl and octyl, alkenyl groups such as vinyl and allyl, aryl groups such as phenyl and tolyl, aralkyl groups such as benzyl, and substituted forms of the foregoing in which some or all carbon-bonded hydrogen atoms are substituted by halogen atoms or cyano radicals, such as chloromethyl, chloropropyl, 3,3,3-trifluoropropyl, and 2-cyanoethyl. Of these groups, $R^1$ and $R^2$ are preferably methyl, and $R^3$, $R^4$ and $R^5$ are preferably methyl or 3,3,3-trifluoropropyl. $R^6$ is a substituted or unsubstituted, aliphatic unsaturated, monovalent hydrocarbon group of 2 to 8 carbon atoms, preferably 2 to 4 carbon atoms, typically an alkenyl group such as vinyl, allyl, propenyl, isopropenyl, butenyl, isobutenyl, pentenyl, hexenyl, cyclohexenyl, heptenyl, octenyl, or nonanyl, with vinyl being preferred. $R^7$ to $R^{11}$ are selected from substituted or unsubstituted, aliphatic unsaturation-free, monovalent hydrocarbon groups of 1 to 8 carbon atoms, preferably 1 to 6 carbon atoms, examples of which include alkyl groups such as methyl, ethyl, propyl and butyl, aryl groups such as phenyl and tolyl, aralkyl groups such as benzyl, and substituted forms of the foregoing in which some or all carbon-bonded hydrogen atoms are substituted by halogen atoms or cyano radicals, such as chloromethyl, chloropropyl, 3,3,3-trifluoropropyl, and 2-cyanoethyl. X is a hydrogen atom or a silyl group selected from the general formulae (2) and (3). The subscript m is an integer of 0 to 30, preferably 0 to 12, and more preferably 3 to 8, n is an integer of 1 to 100, preferably 2 to 50, and more preferably 3 to 20, p is an integer of at least 500, preferably 500 to 10,000, more preferably 950 to 10,000, and still preferably 1,980 to 10,000, and the sum m+n+p is preferably an integer of 600 to 10,000, more preferably 1,000 to 10,000, still preferably 2,000 to 10,000.

In the present invention, a degree of polymerization (i.e., m+n+p in case of component (A) and o+q in case of component (B) described later) or molecular weight can be measured as a weight average degree of polymerization or weight average molecular weight, as measured by gel permeation chromatography (GPC) versus polystyrene standards using toluene or tetrahydrofuran (THF) developing solvent.

The silicone gum or raw rubber in the present invention means an organopolysiloxane having extremely high degree of polymerization or molecular weight which is non-liquid (i.e., solid or paste-like) little or not showing fluidity at room temperature (25° C.±10° C.).

Component (B) is a fluorosilicone gum represented by the average compositional formula (4).

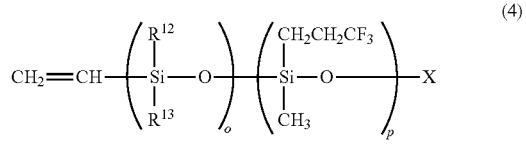

Herein, $R^{12}$ and $R^{13}$ are independently a substituted or unsubstituted, aliphatic unsaturation-free, monovalent hydrocarbon group of 1 to 8 carbon atoms, X is as defined above, o is an integer of 0 to 30, and q is an integer of at least 500.

In formula (4), $R^{12}$ and $R^{13}$ are selected from substituted or unsubstituted, monovalent hydrocarbon groups of 1 to 8 carbon atoms, preferably substituted or unsubstituted, aliphatic unsaturation-free, monovalent hydrocarbon groups of 1 to 6 carbon atoms, examples of which include alkyl groups such as methyl, ethyl, propyl, isopropyl, butyl, isobutyl, tert-butyl, pentyl, hexyl, cyclohexyl, heptyl and octyl, aryl groups such as phenyl and tolyl, aralkyl groups such as benzyl, and substituted forms of the foregoing in which some or all carbon-bonded hydrogen atoms are substituted by halogen atoms or cyano radicals, such as chloromethyl, chloropropyl, 3,3,3-trifluoropropyl and 2-cyanoethyl. Of these groups, methyl and 3,3,3-trifluoropropyl are preferred. X is, as in the same definition in formula (1), a hydrogen atom or a silyl group of the general formula (2) or (3) described above, and preferably a hydrogen atom, trimethylsilyl group or vinyldimethylsilyl group. The subscript o is an integer of 0 to 30, preferably 1 to 20, and more preferably 3 to 10, q is an integer of at least 500, preferably 500 to 10,000, and more preferably 2,000 to 5,000, and the sum o+q is preferably an integer of 500 to 10,000, and more preferably 2,000 to 5,000.

The organopolysiloxane of formula (1) may be prepared by the polymerization method described in JP 5338380. Specifically, it may be obtained from ring-opening polymerization of a mixture of tris(3,3,3-trifluoropropyl)trimethylcyclotrisiloxane, i.e., a cyclic trimer of the following formula (5) as the siloxane source and a cyclotrisiloxane of the following formula (6), for example, as the source for aliphatic unsaturated monovalent hydrocarbon group (typically alkenyl such as vinyl) in the presence of an alkali metal catalyst.

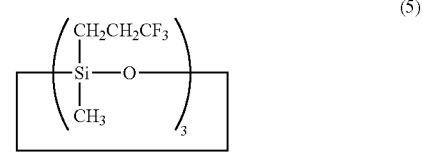

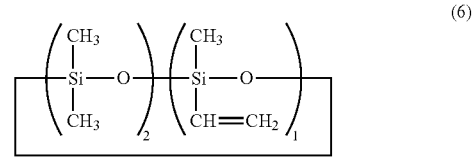

The organopolysiloxane of formula (1) may be obtained by effecting living (co)polymerization of the aforementioned cyclic trisiloxanes in the presence of a polymerization accelerator to synthesize polyfluoroalkylmethylsiloxane, and neutralizing the product with a weak acid such as acetic acid for terminal inactivation. The polymerization accelerator used herein is an alkali metal catalyst, typically an alkyl lithium catalyst such as butyl lithium, or a siloxane oligomer of organolithium compound having the following formula (7), i.e., a monofunctional lithium silanolate catalyst capped with a lithium ion at one end of its molecular chain (see JP-A S62-174260).

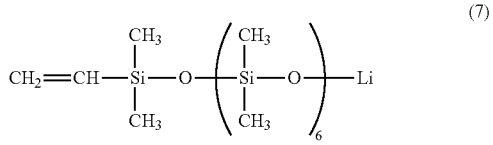

(7)

Alternatively, the intermediate, polyfluoroalkylmethylsiloxane may be capped at its end with a silylating agent having a group of formula (2) and/or (3). The silylating agent having a group of formula (2) or (3) used herein is not particularly limited and may be selected from well-known agents. Exemplary of the silylating agent are organochlorosilanes, organodisilazanes and organodisiloxanes including trimethylchlorosilane, hexamethyldisilazane, hexamethyldisiloxane, dimethylvinylchlorosilane, 1,3-divinyltetramethyldisilazane, 1,3-divinyltetramethyldisiloxane, divinylmethylchlorosilane, 1,3-dimethyltetravinyldisilazane, 1,3-dimethyltetramethyldisiloxane, trivinylchlorosilane, hexavinyldisilazane, and hexamethyldisiloxane.

The silylating method and reaction conditions may in accord with well-known silylating methods and reaction conditions. Specifically, a silylating agent selected from among chlorosilanes, disilazanes and disiloxanes as mentioned above, is added to the polyfluoroalkylmethylsiloxane in an amount of about 1 to 50 moles, preferably about 1 to 20 moles per mole of silanol group (i.e., silicon-bonded hydroxyl group) at the polymer end, whereupon reaction is conducted at room temperature or elevated temperature (e.g., 60 to 150° C., preferably 80 to 120° C.) for silylating the terminal silanol group.

When it is desired to obtain an organopolysiloxane of formula (1) wherein two X's at opposite ends of the molecular chain are both hydrogen and m=0, copolymerization may be carried out in the presence of an alkali metal polymerization catalyst which is, for example, a difunctional lithium silanolate catalyst capped with lithium ions at both ends of the backbone or molecular chain consisting of recurring diorganosiloxane units, represented by the formula (8), or a mixture of an organopolysiloxane capped with silanol groups (i.e., silicon-bonded hydroxyl groups) at both ends of its molecular chain, represented by the formula (9), and an alkyl lithium catalyst or (monofunctional) lithium silanolate catalyst.

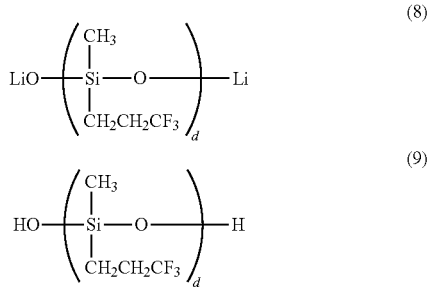

Herein d is an integer in the range: $0 < d \leq 100$.

The organopolysiloxane of formula (4) may be prepared by the same method as in the polymerization of organosiloxane of formula (1) except that the cyclotrisiloxane of formula (6) as the source for aliphatic unsaturated monovalent hydrocarbon group (typically alkenyl such as vinyl) is omitted.

The composition of the invention is characterized in that a blend of a siloxane gum having alkenyl, typically vinyl, of formula (1), derived from the cyclotrisiloxane of formula (6) within its backbone with a siloxane gum having vinyl only at one or both end(s), of formula (4) is cured into a product which experiences little loss of strength even after immersion in fuel oil FAM B.

The reason is presumed as follows. The alkenyl-rich and alkenyl-poor compounds (alkenyl is typically vinyl) form a sea-island structure (i.e., a micro-dispersion structure of alkenyl-rich regions and alkenyl-poor regions), which maintains the retention of tensile strength due to polymer cross-linking, even when the reinforcing effect of silica filler is lost upon swell in FAM B. The structure is effective for preventing the strength from degradation. Accordingly, the content of alkenyl, typically vinyl in the organosiloxane of formula (1) (i.e., a proportion of aliphatic unsaturated, monovalent hydrocarbon groups based on the total of silicon-bonded, substituted or unsubstituted, monovalent hydrocarbon groups) is preferably 0.05 to 0.5 mol %, more preferably 0.1 to 0.3 mol %, still preferably 0.12 to 0.27 mol %. If the alkenyl content is less than 0.05 mol %, the effect of preventing strength degradation may be insufficient. If the alkenyl content is greater than 0.5 mol %, elongation at break and tear strength may be impaired. On the other hand, the content of vinyl in the organopolysiloxane of formula (4) (i.e., a proportion of vinyl based on the total of silicon-bonded, substituted or unsubstituted, monovalent hydrocarbon groups) is preferably 0.01 to 0.09 mol %, more preferably 0.012 to 0.08 mol %, still preferably 0.012 to 0.04 mol %.

Two organopolysiloxanes of formulae (1) and (4) are desirably blended in a weight ratio in the range from 90/10 to 10/90, more preferably from 80/20 to 20/80, still preferably from 70/30 to 30/70. Outside the range, the effect of sea-island structure becomes weak, often failing to gain the benefits of the invention.

Component (C) is a silica filler which is essential to provide a silicone rubber compound with enhanced mechanical strength. To this end, silica should have a specific surface area of 130 to 300 m²/g, preferably 150 to 300 m²/g, as measured by the BET method. Silica with a surface area of less than 130 m²/g may lead to poor tensile strength. That is, the change of tensile strength before and after immersion in FAM B is acceptable, but the magnitude of tensile strength is insufficient.

Examples of the silica filler include dry silica such as fumed silica, and wet silica such as fired silica and precipitated silica. The surface of silica may be treated to be hydrophobic with organopolysiloxanes, organopolysilazanes, chlorosilanes, alkoxysilanes or the like. The silica may be used alone or in admixture of two or more species. The silica filler is added in an amount of 2 to 100 parts by weight, preferably 5 to 60 parts by weight per 100 parts by weight of organopolysiloxanes (A) and (B) combined. Less than 2 parts by weight of silica is too small to exert the reinforcing effect whereas more than 100 parts by weight of silica has negative impact on workability and the physical properties of the resulting silicone rubber.

Component (D) is a curing catalyst which is added to components (A) and (B) whereby they are vulcanized or cured in a standard manner to yield a cured product. For vulcanization or curing, any well-known curing catalysts, preferably organic peroxides may be used. Examples of the curing catalyst include benzoyl peroxide, tert-butyl perbenzoate, o-methylbenzoyl peroxide, p-methylbenzoyl peroxide, di-tert-butyl peroxide, dicumyl peroxide, 1,1-bis(tert-butylperoxy)-3,3,5-trimethylcyclohexane, 2,5-dimethyl-2,5-di(tert-butylperoxy)hexane, and 2,5-dimethyl-2,5-di(tert-butylperoxy)hexyne, which may be used alone or in admixture of two or more. The curing catalyst may be used in a catalytic amount. Preferably the organic peroxide is used in an amount of 0.1 to 5 parts by weight per 100 parts by weight of organopolysiloxanes (A) and (B) combined.

Addition reaction cure is also acceptable, which uses a platinum-based catalyst in combination with an organohydrogenpolysiloxane having at least two silicon-bonded hydrogen atoms as the curing agent. The platinum-based catalyst is preferably used in such amounts to give 1 to 2,000 ppm of platinum metal based on the total weight of organopolysiloxanes (A) and (B). The organohydrogenpolysiloxane is preferably used in such amounts as to provide 0.5 to 5 SiH groups per aliphatic unsaturated hydrocarbon group in organopolysiloxanes (A) and (B).

If desired, the fluorosilicone rubber composition may further comprise well-known additives for silicone rubber compositions as optional components, for example, heat resistance enhancers such as cerium compound and iron oxide, antidegradants, colorants, and parting agents as long as the benefits of the invention are not impaired.

The fluorosilicone rubber composition may be prepared by intimately mixing the above-described components on a rubber milling machine such as a twin-roll mill, Banbury mixer, dough mixer or kneader, before fluorosilicone rubber parts are molded therefrom.

The method of molding the fluorosilicone rubber composition is not particularly limited. The composition may be molded into rubber parts of any desired shape such as O-rings, diaphragms and gaskets according to any conventional rubber molding methods such as compression molding, transfer molding, injection molding, extrusion molding and calender molding. The composition may be cured under ordinary conditions, depending on the type of curing agent. For example, when an organic peroxide catalyst is used, the composition may be cured at 120 to 200° C. for about 1 to 30 minutes. If necessary, secondary vulcanization may be carried out at 180 to 250° C. for about 1 to 10 hours.

It is recommended that the molded parts are used as members that come in contact with alcohol-containing fuel oil, typically FAM B.

EXAMPLE

Examples of the invention are given below by way of illustration and not by way of limitation. In Examples and Comparative Examples, a degree of polymerization is a weight average degree of polymerization as measured by GPC versus polystyrene using toluene developing solvent.

Examples 1 and 2 and Comparative Examples 1 and 2

Four gum blends of a fluorosilicone gum (vinyl content: 0.13 mol %) of formula (10) and a fluorosilicone gum (vinyl content: 0.0125 mol %) of formula (11) in a weight ratio as shown in Table 1 were prepared. To 100 parts by weight of each gum blend, 45 parts by weight of dry silica having a specific surface area of 130 m$^2$/g (Aerosil 130, Nippon Aerosil Co., Ltd.) and 10 parts by weight of diphenylsilanediol as a dispersant were added as shown in Table 1, uniformly kneaded, heat treated at 150° C. for 4 hours, and milled on a twin-roll mill for mastication and plasticization, yielding a fluorosilicone base compound. The base compounds are designated A, B, C, and D.

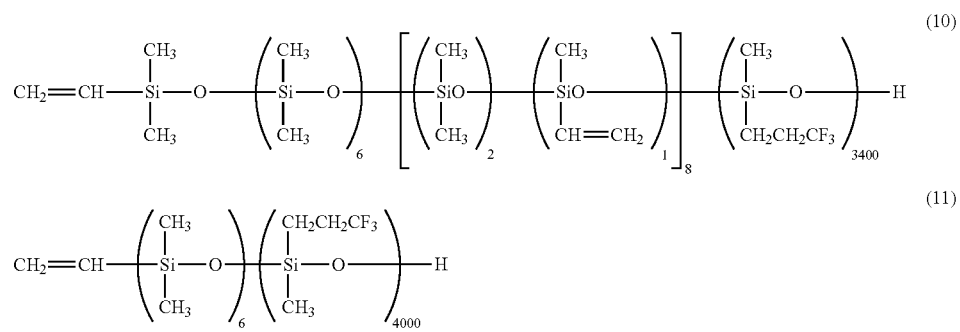

(10)

(11)

To 100 parts by weight of each base compound, 1 part by weight of cerium oxide having an average particle size of 3 m and a specific surface area of 130 m2/g and 0.8 part by weight of a paste containing 80 wt % of 2,5-dimethyl-2,5-di(t-butyl-peroxy)hexane were added. They were mixed on a twin-roll mill until uniform. There were obtained four fluorosilicone rubber compositions, which are designated Examples 1 and 2 and Comparative Examples 1 and 2, respectively.

Physical Property Measurement

According to JIS K-6249, physical properties (hardness, tensile strength, and elongation at break) were measured before (initial) and after FAM B immersion. The composition was cured by press molding at 165° C. for 10 minutes, and post-cured at 200° C. for 4 hours. There were prepared sheet specimens of 2 mm thick for hardness measurement and dumbbell-shape specimens (as defined in JIS K-6249) for tensile strength and elongation at break measurement. Some dumbbell specimens were immersed in fuel oil FAM B at room temperature (25° C.) for one week. The physical properties after immersion were measured immediately after the specimens were taken out of the fuel oil. The results are shown in Table 2.

TABLE 1

| Base compound (pbw) | A | B | C | D |
|---|---|---|---|---|
| Fluorosilicone gum of formula (10) | 30 | 50 | 100 | 0 |
| Fluorosilicone gum of formula (11) | 70 | 50 | 0 | 100 |
| Aerosil 130 | 45 | 45 | 45 | 45 |
| Diphenylsilanediol | 10 | 10 | 10 | 10 |

TABLE 2

|  | Example | | Comparative Example | |
|---|---|---|---|---|
|  | 1 | 2 | 1 | 2 |
| Composition (pbw) | | | | |
| Base compound A | 100 | | | |
| Base compound B | | 100 | | |
| Base compound C | | | 100 | |
| Base compound D | | | | 100 |
| Cerium oxide powder | 1 | 1 | 1 | 1 |
| Vulcanizing paste | 0.8 | 0.8 | 0.8 | 0.8 |
| Initial physical properties | | | | |
| Hardness (Durometer A) | 64 | 60 | 68 | 55 |
| Tensile strength (MPa) | 10.0 | 9.9 | 9.0 | 7.0 |
| Elongation at break (%) | 320 | 370 | 260 | 450 |
| Physical properties after FAM B immersion | | | | |
| Change of hardness (point) | −17 | −17 | −20 | −20 |
| Change of tensile strength (%) | −40 | −38 | −58 | −59 |
| Change of elongation at break (%) | −25 | −28 | −42 | −46 |

Example 3 and Comparative Examples 3 and 4

Three gum blends of a fluorosilicone gum (vinyl content: 0.25 mol %) of formula (12) and a fluorosilicone gum (vinyl content: 0.0125 mol %) of formula (11) or fluorosilicone gum (vinyl content: 0.011 mol %) of formula (13) were prepared as shown in Table 3. To 100 parts by weight of each gum blend, 40 parts by weight of dry silica having a specific surface area of 90 m²/g or 200 m²/g (Aerosil 90 or Aerosil 200, Nippon Aerosil Co., Ltd.) and 10 parts by weight of diphenylsilanediol as a dispersant were added, uniformly kneaded, heat treated at 150° C. for 4 hours, and milled on a twin-roll mill for mastication and plasticization, yielding a base compound. The base compounds are designated E, F, and G.

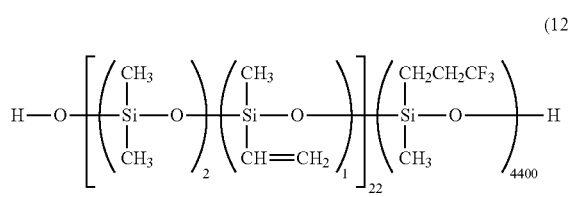

(12)

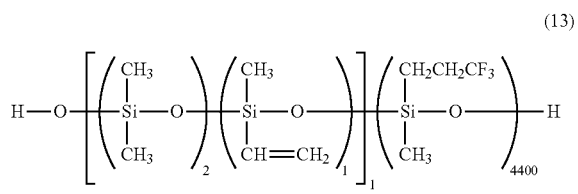

(13)

To 100 parts by weight of each base compound, 1 part by weight of cerium oxide having an average particle size of 3 μm and a specific surface area of 130 m2/g and 0.8 part by weight of a paste containing 80 wt % of 2,5-dimethyl-2,5-di(t-butyl-peroxy)hexane were added. They were mixed on a twin-roll mill until uniform. There were obtained three fluorosilicone rubber compositions.

As in Example 1, the compositions were molded and vulcanized before they were evaluated for physical properties. The results are shown in Table 4.

TABLE 3

| Base compound (pbw) | E | F | G |
|---|---|---|---|
| Fluorosilicone gum of formula (12) | 60 | 60 | 60 |
| Fluorosilicone gum of formula (11) | 40 | | 40 |
| Fluorosilicone gum of formula (13) | | 40 | |
| Aerosil 200 | 40 | 40 | |
| Aerosil 90 | | | 40 |
| Diphenylsilanediol | 10 | 10 | 10 |

TABLE 4

|  | Example | Comparative Example | |
|---|---|---|---|
|  | 3 | 3 | 4 |
| Composition (pbw) | | | |
| Base compound E | 100 | | |
| Base compound F | | 100 | |
| Base compound G | | | 100 |
| Cerium oxide powder | 1 | 1 | 1 |
| Vulcanizing paste | 0.8 | 0.8 | 0.8 |
| Initial physical properties | | | |
| Hardness (Durometer A) | 63 | 62 | 63 |
| Tensile strength (MPa) | 10.2 | 10.5 | 8.1 |
| Elongation at break (%) | 340 | 370 | 400 |
| Physical properties after FAM B immersion | | | |
| Change of hardness (point) | −17 | −18 | −20 |
| Change of tensile strength (%) | −40 | −50 | −51 |
| Change of elongation at break (%) | −28 | −46 | −37 |

Japanese Patent Application No. 2014-048767 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluorosilicone rubber composition comprising:
(A) 10 to 90 parts by weight of a fluorosilicone gum of a formula (1):

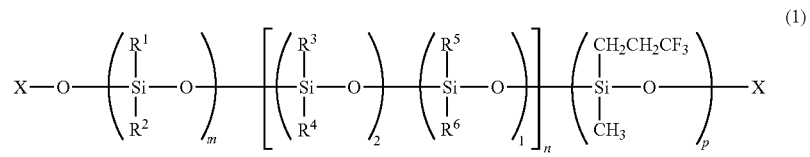

(1)

wherein:
R¹ to R⁵ are each independently a substituted or unsubstituted, monovalent hydrocarbon group of 1 to 8 carbon atoms,
R⁶ is a substituted or unsubstituted, aliphatic unsaturated, monovalent hydrocarbon group of 2 to 10 carbon atoms,
X is a hydrogen atom or a silyl group of a formula (2) or (3):

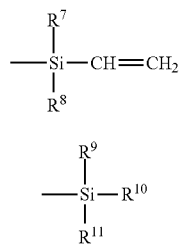
(2)

(3)

wherein R⁷ to R¹¹ are each independently a monovalent hydrocarbon group of 1 to 8 carbon atoms free of aliphatic unsaturation,
m is an integer of 0 to 30,
n is an integer of 1 to 100,
p is an integer of at least 500, and
a unit (B) of the formula:

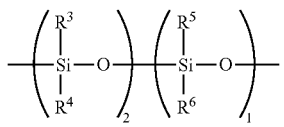

and a unit (C) of the formula:

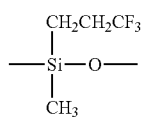

are randomly arranged, and —SiR³R⁴O— and —SiR⁵R⁶O— units in unit (B) are randomly arranged,
(B) 90 to 10 parts by weight of a fluorosilicone gum of a formula (4):

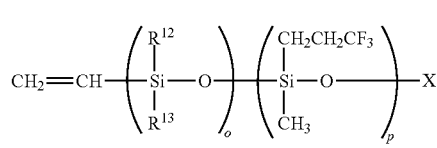
(4)

wherein:
R¹² and R¹³ are each independently a substituted or unsubstituted, monovalent hydrocarbon group of 1 to 8 carbon atoms free of aliphatic unsaturation,
X is as defined above,
o is an integer of 0 to 30, and
q is an integer of at least 500, the sum of components (A) and (B) being 100 parts by weight,
(C) 2 to 100 parts by weight per 100 parts by weight of the sum of components (A) and (B) of reinforcing silica having a specific surface area of at least 130 m²/g, and
(D) a catalytic amount of a curing catalyst.

2. The composition of claim 1 wherein the fluorosilicone gum (A) comprises 0.05 to 0.5 mol % of aliphatic unsaturated, monovalent hydrocarbon groups based on the total of silicon-bonded, substituted or unsubstituted, monovalent hydrocarbon groups.

3. A silicone rubber part which is formed by curing the fluorosilicone rubber composition of claim 1, wherein the part is suitable for use as a structural member in contact with an alcohol-containing fuel oil.

4. The composition of claim 1, wherein X in the formula (1) is a hydrogen atom.

5. The composition of claim 1, wherein X in the formula (1) is a silyl group of the formula (2):

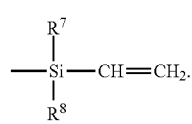
(2)

6. The composition of claim 1, wherein X in the formula (1) is a silyl group of the formula (3):

(3)

7. The composition of claim 1, wherein X in the formula (4) is a hydrogen atom.

8. The composition of claim 1, wherein X in the formula (4) is a silyl group of the formula (2):

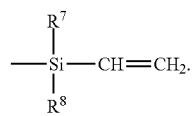
(2)

9. The composition of claim 1, wherein X in the formula (4) is a silyl group of the formula (3):

(3)

10. The composition of claim 1, wherein m is an integer of 0 to 12.

11. The composition of claim 1, wherein m is an integer of 3 to 8.

12. The composition of claim 1, wherein n is an integer of 2 to 50.

13. The composition of claim 1, wherein n is an integer of 3 to 20.

14. The composition of claim 1, wherein p is an integer of 500 to 10,000.

15. The composition of claim 1, wherein o is an integer of 1 to 20.

16. The composition of claim 1, wherein o is an integer of 3 to 10.

17. The composition of claim 1, wherein q is an integer of 500 to 10,000.

18. The composition of claim 1, wherein the organopolysiloxanes of formulae (1) and (4) are blended in a weight ratio in the range from 90/10 to 10/90.

19. The composition of claim 1, wherein the organopolysiloxanes of formulae (1) and (4) are blended in a weight ratio in the range from 80/20 to 20/80.

20. The composition of claim 1, wherein the organopolysiloxanes of formulae (1) and (4) are blended in a weight ratio in the range from 70/30 to 30/70.

* * * * *